United States Patent [19]

Steele

[11] Patent Number: 4,998,822
[45] Date of Patent: Mar. 12, 1991

[54] ROTATION RATE NULLING SERVO AND METHOD FOR FIBER OPTIC ROTATION SENSOR

[75] Inventor: James R. Steele, Northridge, Calif.
[73] Assignee: Litton Systems, Inc., Beverly Hills, Calif.
[21] Appl. No.: 296,121
[22] Filed: Dec. 27, 1988

Related U.S. Application Data

[63] Continuation of Ser. No. 31,323, Mar. 27, 1987, abandoned.

[51] Int. Cl.$^5$ .............................................. G01B 9/02
[52] U.S. Cl. .................................................... 356/350
[58] Field of Search ........................................ 356/350

[56] References Cited

U.S. PATENT DOCUMENTS

| | | |
|---|---|---|
| 4,585,347 | 4/1986 | Auch et al. |
| 4,591,269 | 5/1986 | Mohr ................................. 356/350 |
| 4,707,136 | 11/1987 | Kim ................................... 356/350 |
| 4,735,506 | 4/1988 | Pavlath . |

FOREIGN PATENT DOCUMENTS

| | | |
|---|---|---|
| 2152207A | 7/1980 | United Kingdom . |
| 2100855A | 1/1983 | United Kingdom . |
| 2134248A | 1/1983 | United Kingdom . |
| 2178162 | 2/1987 | United Kingdom ............... 356/350 |

OTHER PUBLICATIONS

Davis, J. and Ezekiel S., Closed-Loop, Low-Noise Fiber-Optic Rotation Sensor, *Optics Letters*, vol. 6, No. 10, pp. 505-507.
LeFevre et al., Progress in Optical Fiber Gyroscopes Using Integrated Optics, pp. 1-12.
Pavlath et al., Fiber-Optic Gyroscopes: Advances and Future Developments, *Navigation: Journal of the Institute of Navigation*, vol. 32, No. 2, Sum. 1984, pp. 70-83.

*Primary Examiner*—Vincent P. McGraw
*Assistant Examiner*—S. A. Turner
*Attorney, Agent, or Firm*—Lynn & Lynn

[57] ABSTRACT

Setting the driving signal of a phase modulator in the sensing loop of a fiber optic gyroscope to zero for a period of time $\tau$ equal to the transit time of the light waves through the gyro causes the gyro to assume a known zero reference state. In this zero reference state the counterpropagating light waves are in phase except for the phase shift caused by rotation of the sensing loop. During this zero reference state, a biase signal for demodulation purposes and a signal that will cause a phase shift equal and opposite to the rotation-induced phase shift are applied to the phase modulator. These signals null the rotation-induced phase shift as seen by a photodetector for a period equal to the transit time.

19 Claims, 7 Drawing Sheets

ROTATION RATE NULLING SERVO AND METHOD FOR FIBER OPTIC ROTATION SENSOR

This is a continuation of application Ser. No. 07/031,323 filed 27 Mar. 1987, and now abandoned.

BACKGROUND OF THE INVENTION

This invention relates generally to rotation sensors and particularly to fiber optic rotation sensors. Still more particularly, this invention relates to apparatus and methods for processing the output signal from a fiber optic rotation sensor to null the rotation-induced phase shift between counterpropagating light waves in a Sagnac ring and to determine the rotation rate of the sensor.

A fiber optic ring interferometer typically comprises a loop of fiber optic material having counter-propagating light waves therein. According to the Sagnac effect the wave traveling in the direction of rotation of the loop has a longer transit time through the loop than the wave traveling opposite to the direction of rotation. This difference in transit time is seen as a shift in the relative phases of the waves. The amount of phase shift depends on the rotation rate. After traversing the loop, the counter-propagating waves are combined so that the interfere to form an optical output signal. The intensity of the optical output signal varies as a function of the type and amount of interference, which is dependent upon the relative phase of the counter-propagating waves. The optical output signal produced by the interference of the counter-propagating waves varies in intensity as a function of the rotation rate of the loop. Rotation sensing is accomplished by detecting the optical output signal and processing it to determine the rotation rate as a function of the phase shift.

In order to be suitable for inertial navigation applications, a rotation sensor must have a very wide dynamic range. The rotation sensor must be capable of detecting rotation rates as low as 0.01 degrees per hour and as high as 1,000 degrees per second. The ratio of the upper limit lower limits to be measured is approximately $10^9$.

It has been found that the dynamic range of a fiber optic rotation sensor to may be increased by applying a feedback signal and to the waves in the sensing coil to null the Sagnac phase shift. A signal indicative of the amount of feedback signal required to null the Sagnac shift may be processed to determine the rotation rate.

Previous signal processing techniques are unduly complex, expensive and inaccurate over the dynamic range required for a navigation grade rotation sensor. Previous signal processing techniques provide inaccurate results at low rotation rates because phase modulators typically are nonlinear devices that cause scale factor nonlinearity.

SUMMARY OF THE INVENTION

The signal processing circuitry according to this invention reduces circuit complexity and solves the problem associated with a nonlinear phase modulator causing scale factor nonlinearity at low rates.

The apparatus according to the invention is a closed loop feedback system for processing signals output from a fiber optic rotation sensor that guides a pair of counterpropagating light waves in a sensing loop of optical fiber and combines the waves to produce an interference pattern indicative of the phase difference between the waves. The apparatus comprises means, such as a photodetector, for producing an electrical signal indicative of the phase difference of the waves; means for modulating the phase of light waves in the sensing loop; means responsive to the phase difference of the waves for controlling the modulating means with a modulating signal that is alternately set to a reference zero phase shift for a first time interval and then adjusted to set the output signal of the sensing loop to be equal to multiples of a known reference phase shift compared to reference zero for a second time interval.

The apparatus according to the invention preferably has both the first and second time intervals set to be equal to the transit time of a light wave through the sensing loop. The reference value compared to reference zero may alternate between $\pm\pi/2$ radians of phase shift. The reference value compared to reference zero may alternate between $\pm\pi/N$ radians of phase shift, where N is any real number. The reference value compared to reference zero may also alternate between $3\pi/2, \pi/2, -\pi/2, -3\pi/2$ radians of phase shift for successive repetitions of the second time interval of combination of the two patterns. Other values, such as $\pm\pi/N\pm(2\pi-\pi/N)$ may be used for the reference value.

The apparatus according to the invention may further include gating means connected to the means for producing an electrical signal indicative of the phase difference of the waves; rate demodulating means connected to the output of the gating means for determining the rate and direction of rotation; and amplitude demodulating means connected to the output of the gating means to adjust the calibration of rate demodulating means.

The means for processing signals output from a fiber optic rotation sensor that guides a pair of counterpropagating light waves in a sensing loop of optical fiber and combines the waves to produce an interference pattern indicative of the phase difference between the waves, comprises the steps of producing an electrical signal indicative of the phase difference of the waves; modulating the phase of light waves in the sensing loop; and controlling the modulating means with a modulating signal that is alternately set to reference zero for a first time interval and then adjusted to set the output signal of the sensing loop to be equal to integer multiples of a known reference value for a second time interval.

The method according to the invention may further include the step of setting the first and second time intervals equal to the transit time of a light wave through the sensing loop.

The method according to the invention may further include the step of setting the reference values to alternate between $\pm\pi/2$ radians of phase shift. The method according to the invention may further include the step of setting the reference value to be the sequence $3\pi/2, \pi/2, -\pi/2, -3\pi/2$ radians of phase shift for successive repetitions of the second time interval.

The method according to the invention may further include the steps of gating the electrical signal indicative of the phase difference of the waves; demodulating the gated electrical signal to determine the rotation rate and direction; and demodulating the gated electrical signal to adjust the calibration of the rotation rate signal.

DESCRIPTION OF THE PREFERRED EMBODIMENT

Figure 1:
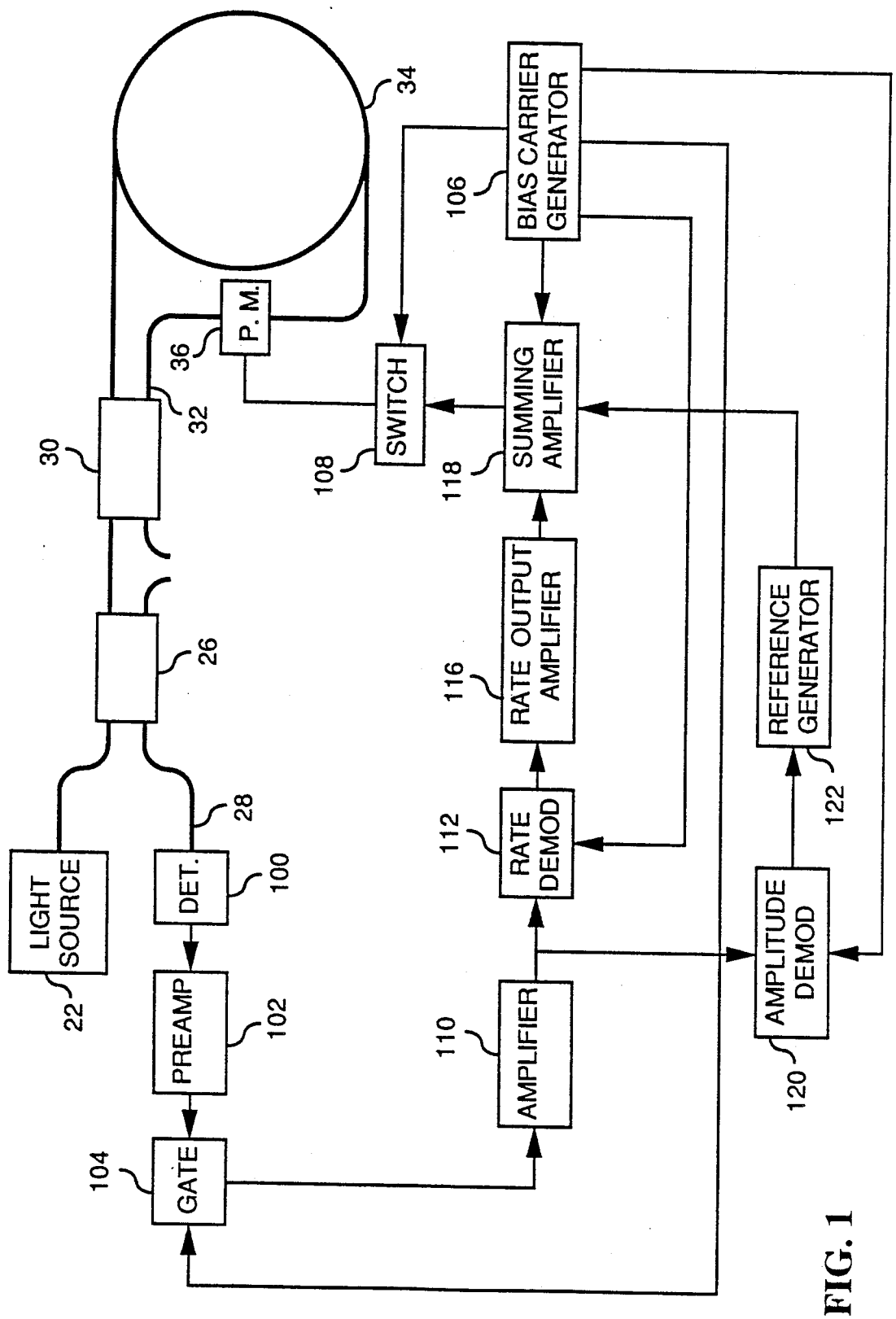
FIG. 1 illustrates a fiber optic rotation sensor and circuitry for processing the optical signal output from the Sagnac ring to null the Sagnac phase shift.

Referring to FIG. 1, a fiber optic rotation sensor 20 includes a light source 22 that supplies coherent light to an optical fiber 24. The optical fiber 24 guides the source beam to a fiber optic directional coupler 26, which couples light between the optical fiber 24 and an optical fiber 28. Light that propagates through the fiber optic directional coupler 26 and remains in the optical fiber 24 is guided to a second fiber optic directional coupler 30. The fiber optic directional coupler 30 couples light between the optical fiber 24 and a third length of an optical fiber 32.

Light that propagates through the fiber optic directional coupler 30 and remains in the fiber 24 then propagates to a sensing coil 34. Light that enters the sensing coil 34 from the fiber optic directional coupler 30 forms a clockwise wave in the coil. The sensing coil 34 may be formed from a separate optical fiber, or it may be formed in a portion of the optical fiber 24. After passing through the sensing coil 34, the clockwise wave enters a phase modulator 36.

Light that the fiber optic directional coupler 30 couples from the optical fiber 24 into the optical fiber 32 forms a counterclockwise wave. The optical fiber 32 may be either a separate fiber or a portion of the optical fiber that forms the sensing coil 34. The counterclockwise wave first passes through the phase modulator 36 before entering the sensing coil 34.

The clockwise wave and the counterclockwise wave have the same phase before they pass through the sensing coil 34. If the 34 is rotating about a line through the plane of the coil, then the waves experience a phase shift relative to each other. The clockwise wave in the optical fiber 32 enters the fiber optic directional coupler 30 after passing through the phase modulator 36, and the counterclockwise wave enters the fiber optic directional coupler 30 after passing through the sensing coil 34. Part of the counterclockwise wave propagates through the fiber optic directional coupler 30, and the remainder of the counterclockwise wave couples into the end 38 of the optical fiber 32. A portion of the clockwise wave remains in the fiber 32, and the remainder of the clockwise wave is coupled into the fiber optic directional coupler 26 by the fiber optic directional coupler 30.

Fiber optic directional couplers and fiber optic phase modulators that may be used in the fiber optic gyroscope system 20 are described below. Both of the optical couplers 26 and 30 may be of substantially identical structure; therefore, the following description of the optical coupler 26 is applicable to all optical couplers included in the interferometric sensor system 20 when the optical fibers 24, 28 and 32 are single mode fibers.

A fiber optic directional coupler suitable for use in single mode applications as the couplers 24 and 28 of FIG. 1 is described in the Mar. 29, 1980 issue of *Electronics Letters*, Vol. 28, No. 28. pp. 260–261 and in U.S. Pat. No. 4,493,528 issued Jan. 15, 1985 to Shaw et al. That patent is assigned to the Board of Trustees of the Leland Stanford Junior University. The disclosure of that patent is hereby incorporated by reference into the present disclosure. The coupler disclosed in U.S. Pat. No. 4,493,528 is briefly described below.

Figure 7:
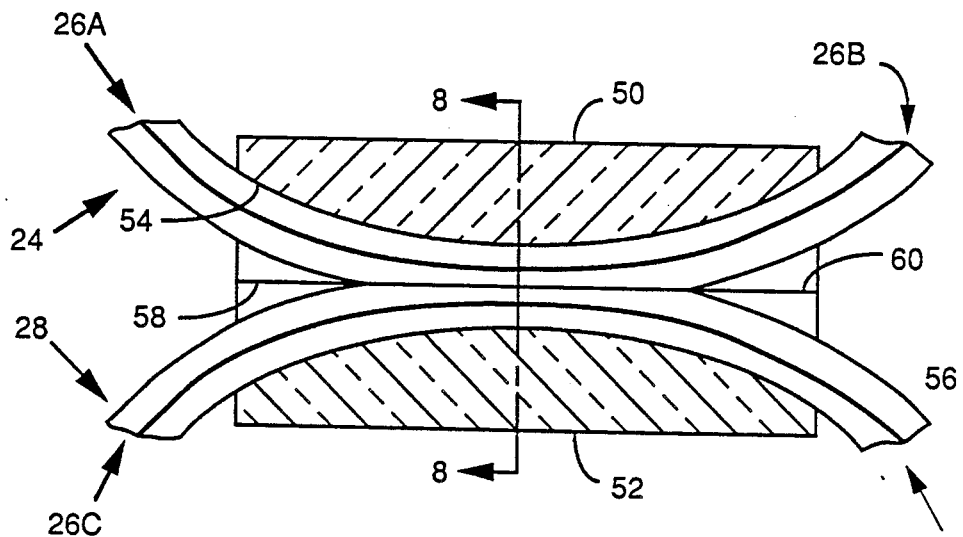
FIG. 7 is a cross sectional view of an optical coupler that may be included in the fiber optic gyroscope of FIG. 1.
Figure 8:
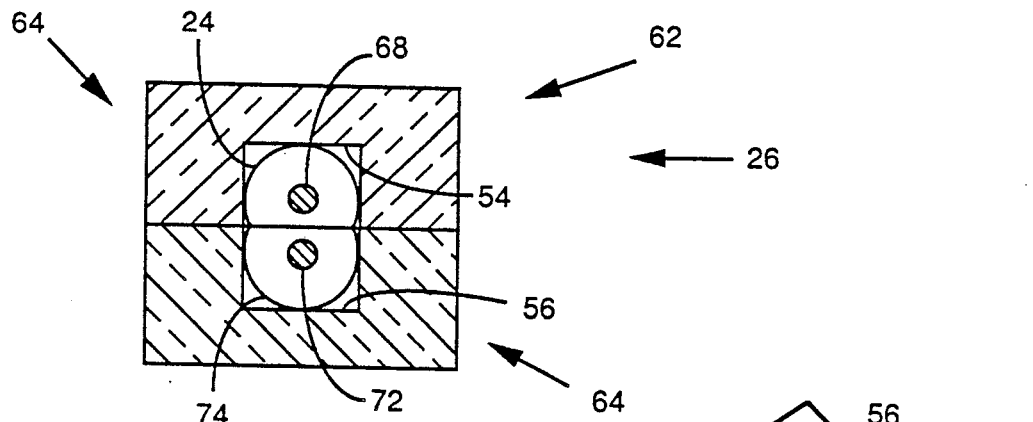
FIG. 8 is a cross sectional view taken about line 8—8 of FIG. 7.

As illustrated in FIGS. 7 and 8, the coupler 26 includes the optical fibers 24 and 28 of FIG. 1 mounted in a pair of substrates 50 and 52, respectively. The fiber 24 is mounted in a curved groove 54 formed in an optically flat surface 58 of the substrate 50. Similarly, the fiber 30 is mounted in a curved groove 56 formed in an optically flat surface 60 of the substrate 52. The substrate 50 and fiber 24 mounted therein comprise a coupler half 62, and the substrate 52 and fiber 30 mounted therein comprise a coupler half 64.

The curved grooves 54 and 56 each have a radius of curvature that is large compared to the diameters of the fibers 24 and 28, which are ordinarily substantially identical. The widths of the grooves 54 and 56 are slightly larger than the fiber diameters to permit the fibers 26, 30 to conform to the paths defined by the bottom walls of the grooves 54 and 56, respectively. The depths of the grooves 54 and 56 vary from a minimum at the center of the substrates 50 and 52, respectively, to a maximum at the edges of the substrates 50 and 52. The variation in groove depth permits the optical fibers 24 and 28, when mounted in the grooves 54 and 56, respectively, to gradually converge toward the centers and diverge toward the edges of the substrates 50 and 52, respectively. The gradual curvature of the fibers 24 and 28 prevents the occurrence of sharp bends or other abrupt changes in direction of the fibers 24 and 28 to avoid power loss through mode perturbation. The grooves 54 and 56 may be rectangular in cross section; however, it is to be understood that the grooves 54 and 56 may have other cross sectional configurations such as U-shaped or V-shaped may be used in forming the coupler 26.

Figure 4:
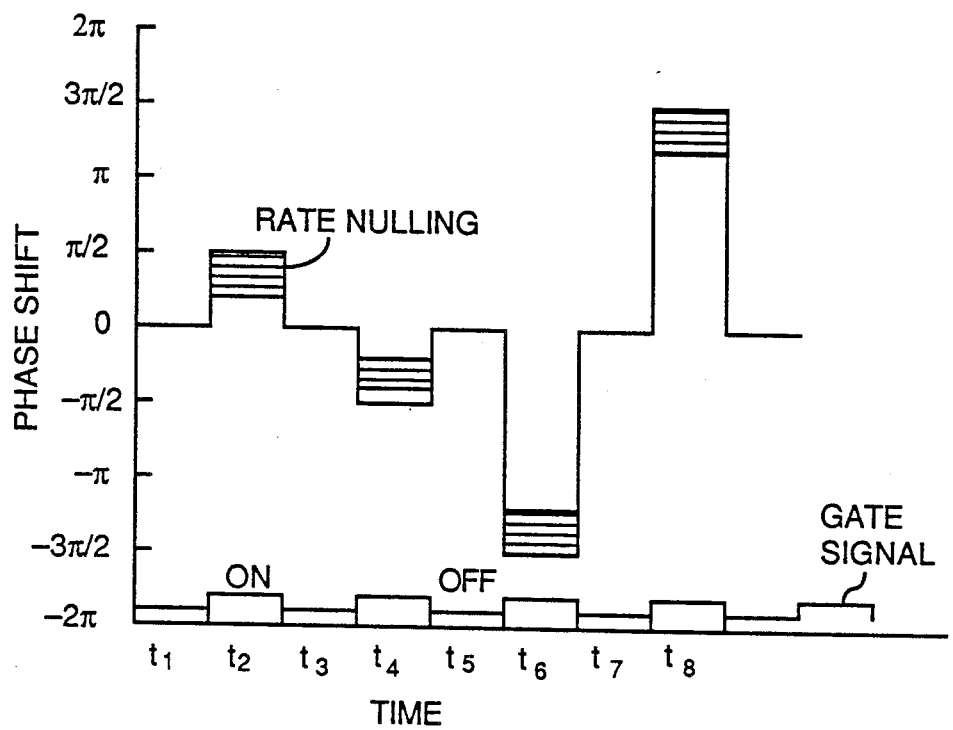
FIG. 4 graphically illustrates a gate signal and superposition of a bias signal and rotation rate nulling signal.
Figure 5:
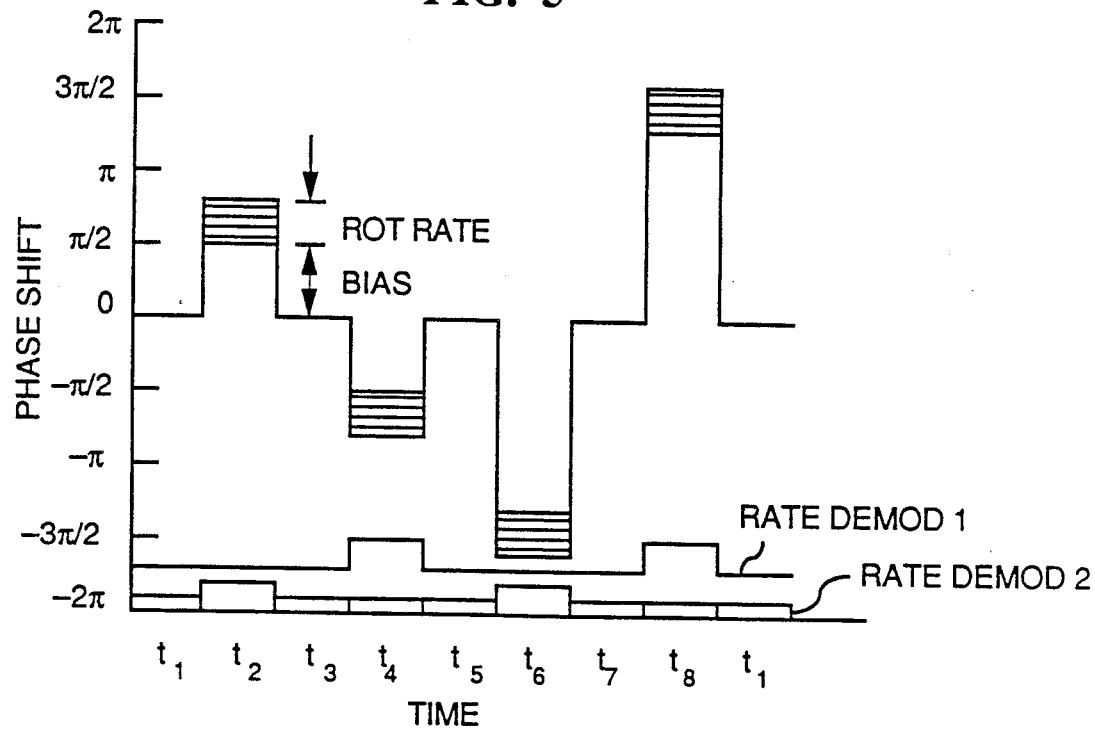
FIG. 5 graphically illustrates rate demodulation signals and superimposed bias signal and rotation rate nulling signals.
Figure 6:
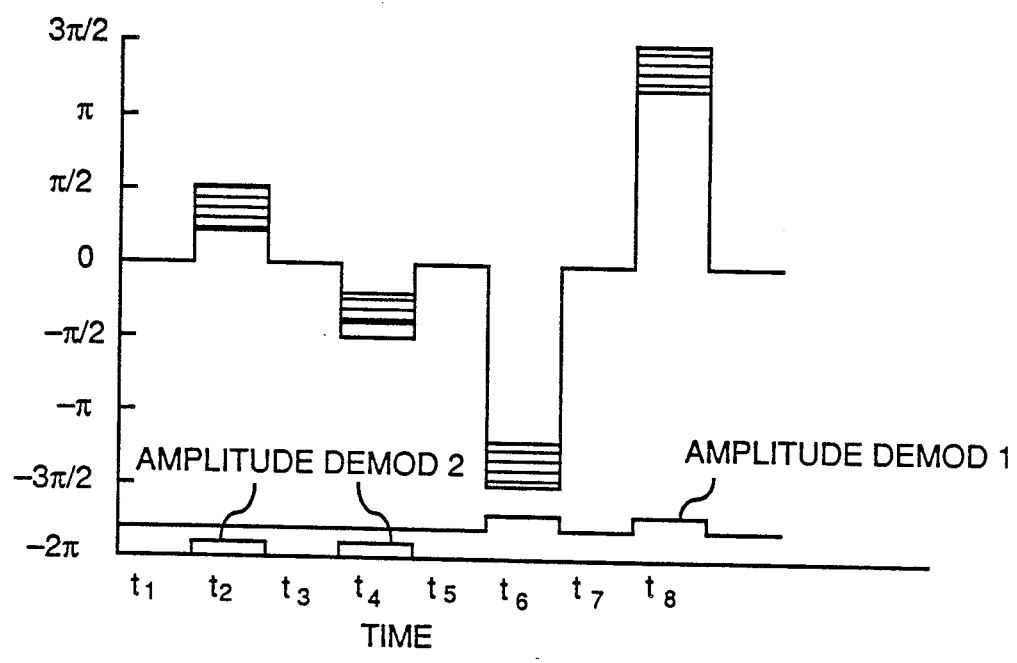
FIG. 6 graphically illustrates a pair of amplitude demodulation signals and superimposed bias carrier and rate nulling signals.
Figure 9:
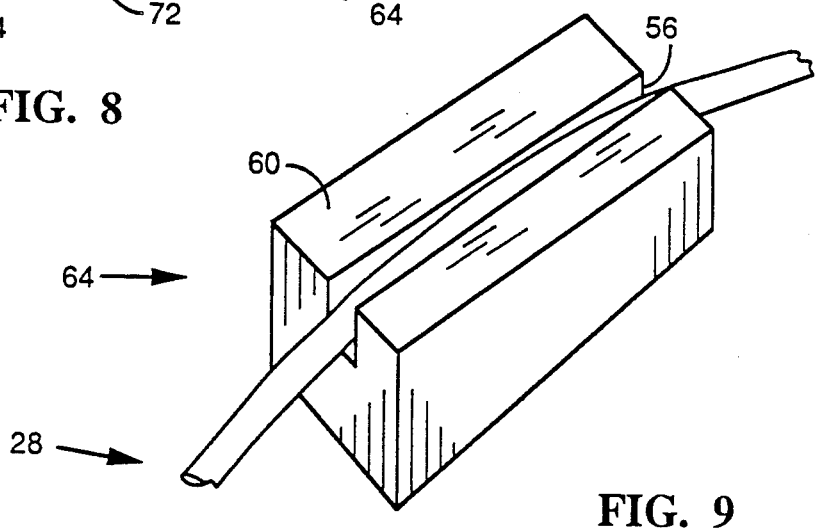
FIG. 9 is a perspective view of a coupler half that may be included in the fiber optic gyroscope of FIG. 1.

Referring to FIGS. 7-9, at the centers of the substrates 50 and 52, the depths of the grooves 54 and 56 are less than the diameters of the fibers 24 and 28. At the edges of the substrates 50 and 52, the depths of the grooves 54 and 56 are preferably at least as great as the fiber diameters. Fiber optic material is removed from each of the fibers 24 and 28 by any suitable method, such as lapping, to form oval-shaped planar surfaces in the fibers 24 and 28. The oval surfaces are juxtaposed in facing relationship to form an interaction region 66 where the evanescent field of light propagated by each of the fibers 24 and 28 interacts with the other fiber. The amount of fiber optic material removed increases gradually from zero near the edges of the substrates 50 and 52 to a maximum amount at their centers. As shown in FIGS. 4-6, the tapered removal of fiber optic material enables the fibers 24 and 28 to converge and diverge gradually, which is advantageous for avoiding backward reflection and excessive loss of light energy at the interaction region 66.

Light is transferred between the fibers 24 and 28 by evanescent field coupling at the interaction region 66. The optical fiber 24 comprises a central core 68 and a surrounding cladding 70. The fiber 30 has a core 72 and a cladding 74 that are substantially identical to the core 68 and cladding 70, respectively. The core 68 has a refractive index that is greater than that of the cladding 70, and the diameter of the core 68 is such that light propagating within the core 68 internally reflects at the core-cladding interface. Most of the optical energy guided by the optical fiber 24 is confined to its core 68. However, solution of the wave equations for the fiber 68 and applying the well-known boundary conditions shows that the energy distribution, although primarily in the core 68, includes a portion that extends into the cladding and decays exponentially as the radius from the center of the fiber increases. The exponentially decaying portion of the energy distribution within the fiber 68 is generally called the evanescent field. If the evanescent field of the optical energy initially propagated by the fiber 24 extends a sufficient distance into the fiber 30, energy will couple from the fiber 24 into the fiber 30.

To ensure proper evanescent field coupling, the amount of material removed from the fibers 24 and 28 must be carefully controlled so that the spacing between the cores of the fibers 24 and 28 is within a predetermined critical zone. The evanescent field extends a short distance into the cladding and decreases rapidly in magnitude with distance outside the fiber core. Thus, sufficient fiber optic material should be removed to permit overlap between the evanescent fields of waves propagated by the two fibers 24 and 28. If too little material is removed, the cores will not be sufficiently close to permit the evanescent fields to cause the desired interaction of the guided waves; and therefore, insufficient coupling will result.

The extent of the critical zone for a particular coupler depends upon a number of factors, such as the parameters of the fibers and the geometry of the coupler. The critical zone may be quite narrow for a single mode fiber having a step index profile. The center-to-center spacing of the fibers 24 and 28 is typically less than 2 to three core diameters.

The coupler 26 of FIG. 1 includes four ports labeled 26A, 26B, 26C and 26D. Ports 26A and 26B, which are on the left and right sides, respectively, of the coupler 26 correspond to the fiber 24. The ports 26C and 26D similarly correspond to the fiber 28. For purposes of explanation, it is assumed that an optical signal input is applied to port 26A through the fiber 24. The signal passes through the coupler 26 and is output at either one or both of ports 26B or 26D depending upon the amount of coupling between the fibers 26 and 28. The "coupling constant" is defined as the ratio of the coupled power to the total output power. In the above example, the coupling constant is the ratio of the power output at port 26D divided by the sum of the power output at the ports 26B and 26D. This ratio is sometimes called the "coupling efficiency", which is typically expressed as a percent. Therefore, when the term "coupling constant" is used herein, it should be understood that the corresponding coupling efficiency is equal to the coupling constant times 100.

The coupler 26 may be tuned to adjust the coupling constant to any desired value between zero and 1.0 by offsetting the confronting surfaces of the fibers 26 and 28 to control the dimensions of the region of overlap of the evanescent fields. Tuning may be accomplished by sliding the substrates 50 and 52 laterally or longitudinally relative to one another.

Light that is cross-coupled from one of the fibers 24 and 28 to the other undergoes a phase shift of $\pi/2$, but light that passes straight through the coupler 26 without being cross-coupled is not shifted in phase. For example, if the coupler 26 has a coupling constant of 0.5, and an optical signal is input to port 26A, then the outputs at ports 26B and 26D will be of equal magnitude; but the output at port 26D will be shifted in phase by $\pi/2$ relative to the output at port 26B.

The coupler 26 is highly directional, with substantially all of the power applied at one side thereof being output at the ports on the other side. The directional characteristic is symmetrical in that some light applied to either ports 26B or 26D is delivered to ports 26A and 26B. The coupler 26 is essentially non-discriminatory with respect to polarizations and preserves the polarization of light input thereto.

Figure 10:
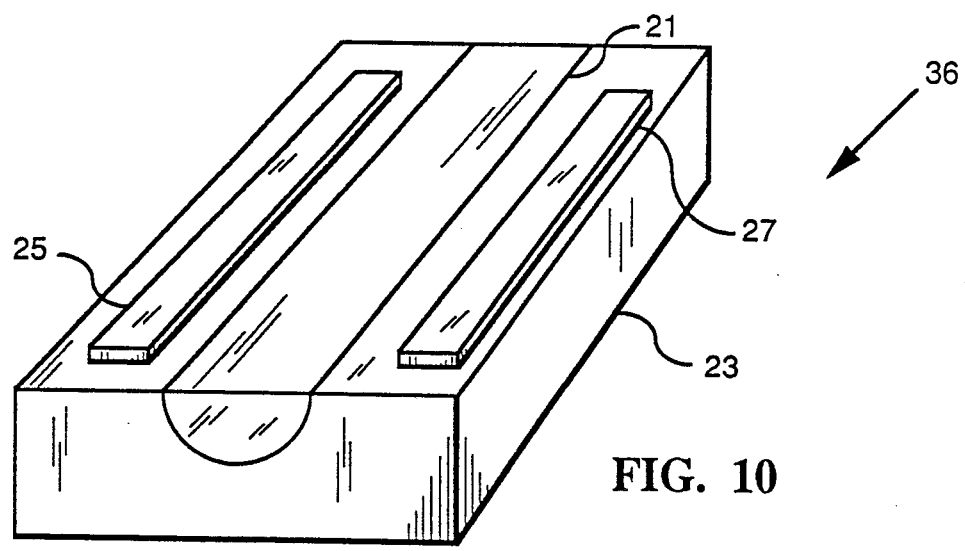
FIG. 10 is a perspective view of an integrated optics phase modulator that by may be included in the fiber optic gyroscope of FIG. 1.
Figure 11:
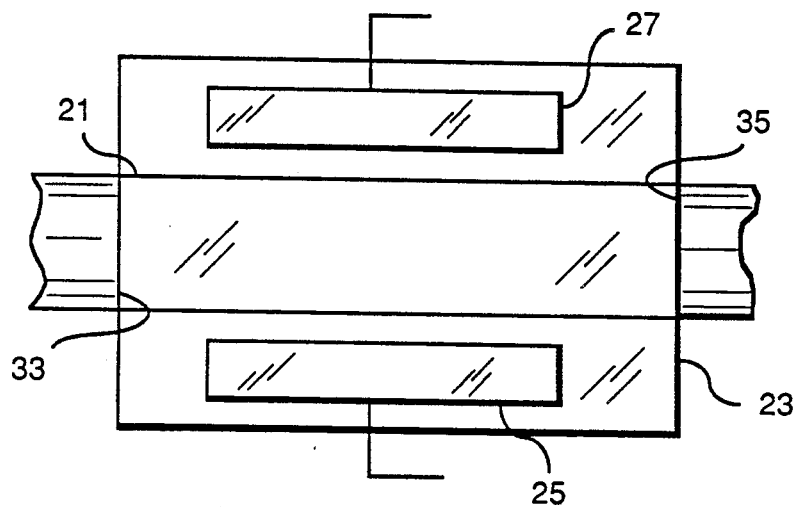
FIG. 11 is plan view of the phase modulator of FIG. 10.
Figure 12:
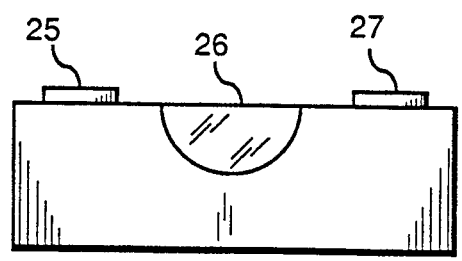
FIG. 12 is an end elevation view of the phase modulator of FIGS. 10 and 11.

Referring to FIGS. 10-12, the phase modulator 36 may comprise an optical waveguide 21 formed on a substrate 23 of an electrooptically active material such as lithium niobate. A pair of electrodes 25 and 27 are attached to the substrate on opposite sides of the waveguide 21. The electrodes 25 and 27 may be formed on the substrate 23 by vapor deposition of aluminum. The optical waveguide 21 may be formed in the substrate 23 by first depositing a strip of titanium on the substrate 23 and heating it to drive the titanium into the substrate 23. The resulting waveguide 21 has a generally semicircular cross section as shown in FIGS. 10 and 12. The fiber 32 must be cut to have two ends 33 and 35 that are butt coupled to opposite sides of the optical waveguide 21 as shown in FIGS. 1 and 11.

Application of a voltage across the electrodes changes the refractive index of the optical waveguide 21 by means of the electrooptic effect. The transit time of a light wave through the waveguide 21 is the product of the length of the waveguide and its refractive index divided by the speed of light in vacuum. Changing the refractive index of the optical waveguide 21 thus changes the transit time of an optical signal through it. Because of the sinusoidal nature of the electromagnetic fields that comprise the light wave, the change in transit time is seen as a change in phase of the wave. TRW sells a lithium niobate phase modulator device that is suitable for use as the phase modulator 36.

The signal processing circuitry shown in FIG. 1 applies a phase shift signal to the phase modulator 36 to directly null the phase shift of the light waves caused by the rotation rate of the sensing loop 34. The output of the detector 100 is input to a preamplifier 102, which amplifies the signal and conditions it for input to a gate 104. The detector 100 may be a commercially available device such as Motorola MFOD 2404, which includes a photodiode and a hybrid amplifier with wide bandwidth characteristics. The gate 104 may be a CMOS analog switch such as the Siliconix DG271. A bias carrier generator 106 controls both the gate 104 and a switch 108, which is connected to the phase modulator 36. When the gate 104 is conductive, the output of the preamplifier 102 is input to an amplifier 110. The amplified signal is output from the amplifier 110 and then input to a rate demodulator 112 and to an amplitude demodulator 120. The output of the rate demodulator 112 is input to a rate output amplifier 116 which provides an input to a summing amplifier 118. The bias carrier generator 106 also provides an actuating signal to the rate demodulator 112.

The output of the amplifier 110 is also input to an amplitude demodulator 120, which receives a signal from the bias carrier generator 106. The signal output from the amplitude demodulator 120 is input to a reference generator 122, which provides an output to control the gain of the summing amplifier 118.

The fundamental principal of this invention is that setting a gyro phase modulator signal to zero or reference zero for a period of time $\tau$ equal to the transit time of the light waves through the gyro causes the gyro to assume a known zero or reference state. In this zero or reference state the counterpropagating light waves will be in phase except for the phase shift caused by rotation of the sensing loop 34. After this zero state and during the next state, a bias signal for demodulation purposes and a signal that will cause a phase shift that is equal and opposite to the rotation caused phase shift are applied to the phase modulator. These signals will detect and null the rotation induced phase shift as seen by the photodetector 100 for a period equal to the transit time $\tau$.

After this measurement period the phase modulator signal must again be set to zero or a reference level for a period equal to the transit time $\tau$. After this zero period a signal that will cause a phase shift equal and opposite to the rotation-induced phase shift and an opposite polarity bias signal are applied to the phase modulator 36 to null the rotation rate of the sensing loop 34 as seen by the photodetector 100. The amplitude of the signal applied to the phase modulator 34 to null the rotation rate of the sensing loop 34 is directly proportional to the output rate of the gyro.

In a high accuracy rotation sensor the alternating the carrier bias levels are preferably stabilized between $\pm \pi/2$ and $\pm 3\pi/2$ and demodulated over more than one fringe of the gyro. There are many possible implementations that will perform the function of generating the waveforms necessary to implement the direct feedback of the rotation rate signal to a fiber optic gyro. One suitable set of waveforms suitable for practicing the present invention is shown in FIGS. 2-6.

Figure 2:
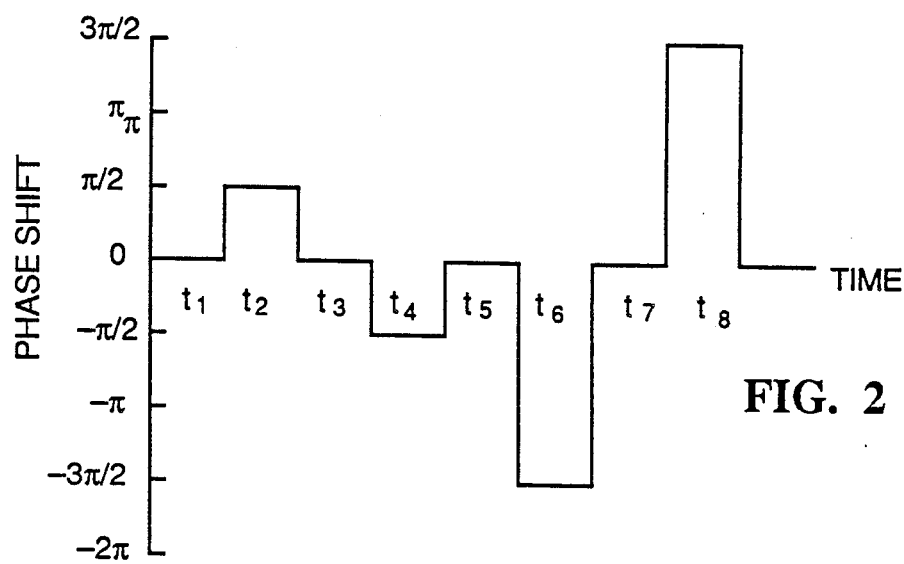
FIG. 2 graphically illustrates a carrier or bias signal that may be applied to optical signals in the sensing coil to sense rotation induced phase shift between counter propagating light waves in the coil.

FIG. 2 graphically shown possible carrier or bias signals for implementing the required algorithm. For clarity in explaining the invention, the signals illustrated in FIG. 2 show the time interval divided into eight periods $t_1$ thru $t_8$ on the horizontal axis. Each period is equal to the transit time $\tau$ of the light through the sensing loop 34. The range of the signal on the vertical axis of FIG. 2 is $\pm 2\pi$. The range of the signal is the phase shift of the light in the sensing loop 34 caused by a signal applied to the phase modulator 36. In actual practice other numbers of periods may be used. The basic considerations are that the rotation rate may change rapidly, but the calibration gain is an environmental phenomenon that may change slowly.

The bias or carrier is the signal applied to the phase modulator 36 to permit demodulation of rotation information. During the time interval $t_1$, the bias signal is set to reference zero at the phase modulator 36, which allows the development of a known phase relationship between the CW and CCW light signals in the sensing loop 34. At time $t_2$ a signal is applied to the phase modulator 34 that causes the signal output of the sensing loop 34 to have a known reference value at the photodetector 100. The amplifier 110 of FIG. 3 amplifies the signal output from the sensing loop 34. This actual value of the sensing loop 34 output signal is arbitrary and may depend upon the particular application and gyro conditions.

At the beginning of the third time interval $t_3$ the sensing loop 34 output signal is again returned to zero for one period again to allow the CW and CCW light signals to assume the same known state as in the interval $t_1$. At time $t_4$ a signal having the same amplitude but opposite polarity as in the interval $t_2$ is applied to the phase modulator 36. In the absence of any rotation information, this signal should give an output signal to the photodetector 100 having the same amplitude as the signal output during the time interval $t_2$. During the time interval $t_5$ the signal is again returned to the reference state as in $t_1$.

During time interval $t_6$ a signal that is the same as the signal used in the interval $t_2$ plus $2\pi$ is applied to the phase modulator 36. This signal should produce at the photodetector 100 output a signal that is the same as in the second time interval $t_2$ if the scaling of the phase modulator scaling 36 is correct. If the amplitude of the phase modulator scaling is not the same as the output during the interval $t_2$, the signal output during the interval $t_6$ may be separately demodulated and used to produce a correction to the output. During the time interval $t_7$ the reference zero signal of the interval $t_1$ is again applied to the phase modulator 36.

In the time interval $t_8$ a signal that is the same as in the interval $t_4$ plus $2\pi$ is applied to the phase modulator 36. This signal will give the same output as the signal used at $t_4$ and also may be used to correct the amplitude of the phase modulator scaling. After $t_8$ the sequence of signals applied to the phase modulator 36 repeats starting again at $t_1$.

Figure 3:
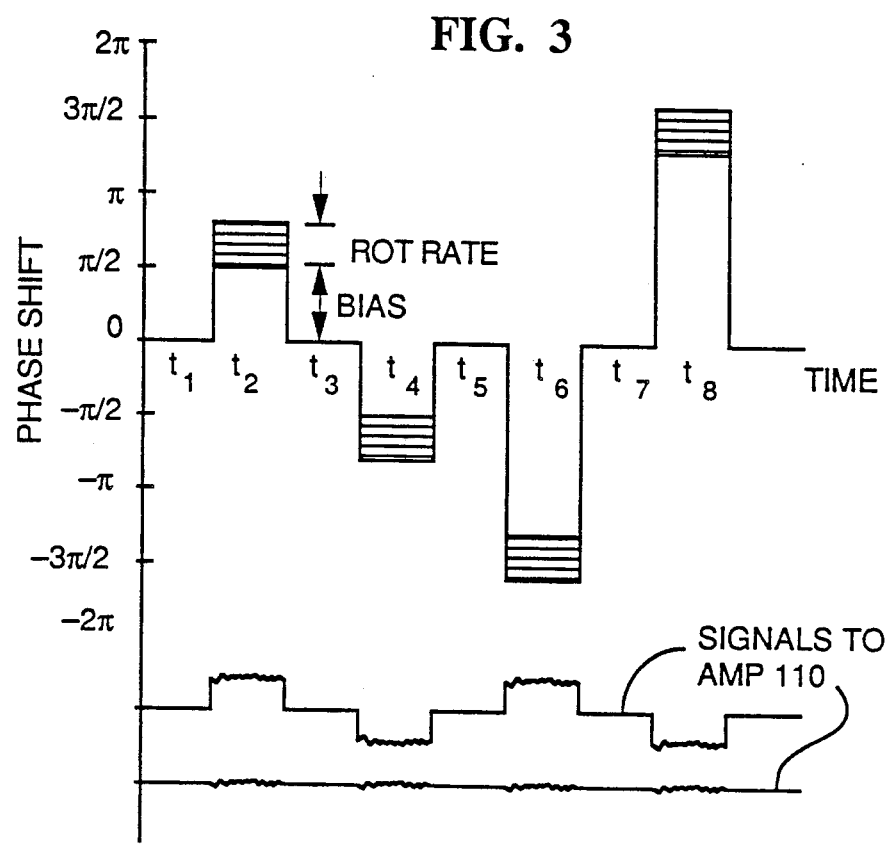
FIG. 3 graphically illustrates the signal of FIG. 2 plus a second feedback signal a second carrier or bias signal that may be applied to optical signals in the sensing coil to null the rotation induced phase shift between counter propagating light waves in the coil.

In FIG. 3 the axes are the same as in FIG. 2, and the bias or carrier information is also the same. A signal labeled ROTATION RATE is shown superimposed on the bias information. The rotation rate signal has the correct amplitude, phase and polarity to null or cancel the rotation rate of the sensing loop 34. Still referring to FIG. 3, during the time interval $t_1$, the output of the phase modulator 36 is still set to zero. After the time $\tau$, the CW and CCW light signals will be in phase except for the phase shift in the light waves caused by the rotation of the sensing loop 34. At time $t_2$ the bias or carrier signal is applied to the phase modulator 36 with a signal whose amplitude and polarity are exactly that needed to null the rotation caused rate of the sensing loop 34. The net output of the photodetector 100 then should be exactly the same as that described with reference to FIG. 1.

At t₃ the phase modulator 36 is again set to zero, and the light waves in the sensing coil 34 will again be in phase except for the phase difference caused by the rotation rate.

At t₄ the bias signal of the opposite polarity of that used in the interval t₂ is applied to the phase modulator 36 with the same amplitude and polarity of the rotation signal used in T₂. This will give the same photo detector output as the signal in t₂. At t₅ the phase modulator 36 is again set to zero and the bias is again summed with the same amplitude and polarity of rotation signal to give the same output as in t₂.

At t₇ the signal is again set to zero, and at t₈ a signal of the same amplitude and polarity as the rotation nulling signal is again summed with the previously described bias for the same signal output from the photodetector 100.

The two lower plots in FIG. 3 represent the outputs of the amplifier 110 when the sensing loop 34 experiences a rotational acceleration and when the detector signal is nulled. During rotational accelerations, the output of the amplifier 110 is a rectangular wave with noise superimposed thereon when the gate 102 is open. When the rotation-induced phase shift is nulled, the output of the amplifier 110 is only the background noise.

FIG. 4 shows the information of FIG. 3 with a signal called GATE shown along the lower portion of the graph. The information of interest in this sensing loop occurs at the times labeled t₂, t₄, t₆, and t₈. The output of the photodetector at times other than those of interest will disrupt the input of amplifier 110 unless these signals are gated out. The GATE signal, when applied to the gate 104, effectively gates out the unwanted signals.

FIG. 5 shows the bias carrier and the rotation rate nulling signal and the necessary signals to demodulate any error in the output of the photodetector 100 caused by the rotation rate nulling signal being the incorrect value to null and rotation rate of the sensing loop 34. The signal output by the photodetector 100, gated by the gate signal, amplified and demodulated by the rate demodulator 112 is now used to provide a feedback signal for correcting the rotation rate nulling signal. The amplitude of the rotation rate null signal is proportional to the rotation rate of the sensing loop 34 and is used as the output of the rotation sensor 20.

FIG. 6 shows the bias carrier and the rate nulling signal with a signal used to demodulate the output amplitude information. The signals that occur at t₆ and t₈ may be demodulated by this signal and used to servo the gain of the amplifier to cause exactly $\pm 3\pi$ radians of phase shift in the phase modulator for a $\pm 2\pi$ input.

FIG. 1 shows a block diagram of one possible circuit for implementing the algorithm described above. The circuitry of FIG. 1 may be formed of either analog or digital components. Referring to FIG. 1, the output of the detector 100 is amplified by the preamplifier 102 and gated by the gate 104. The gated output is then amplified by the amplifier 110 and sent to the rate demodulation circuit 112 and to the amplitude demodulator circuit 120. The rate amplifier produces a signal that is directly proportional to the output rate of the sensor loop 34. This rate signal is then summed with the bias carrier signal and switched on and off as shown in FIG. 2. The resulting signal is then used to close the rate servo loop.

The amplitude demodulation circuit 120 uses the demodulation signals of FIG. 6 to generate an error signal that is used to servo the reference generator 122 to the amplitude that will cause the output to be exactly $\pm 2\pi$. The reference generator 122 controls the gains of the rate amplifier 116 and the summing amplifier 118.

Figure 13:
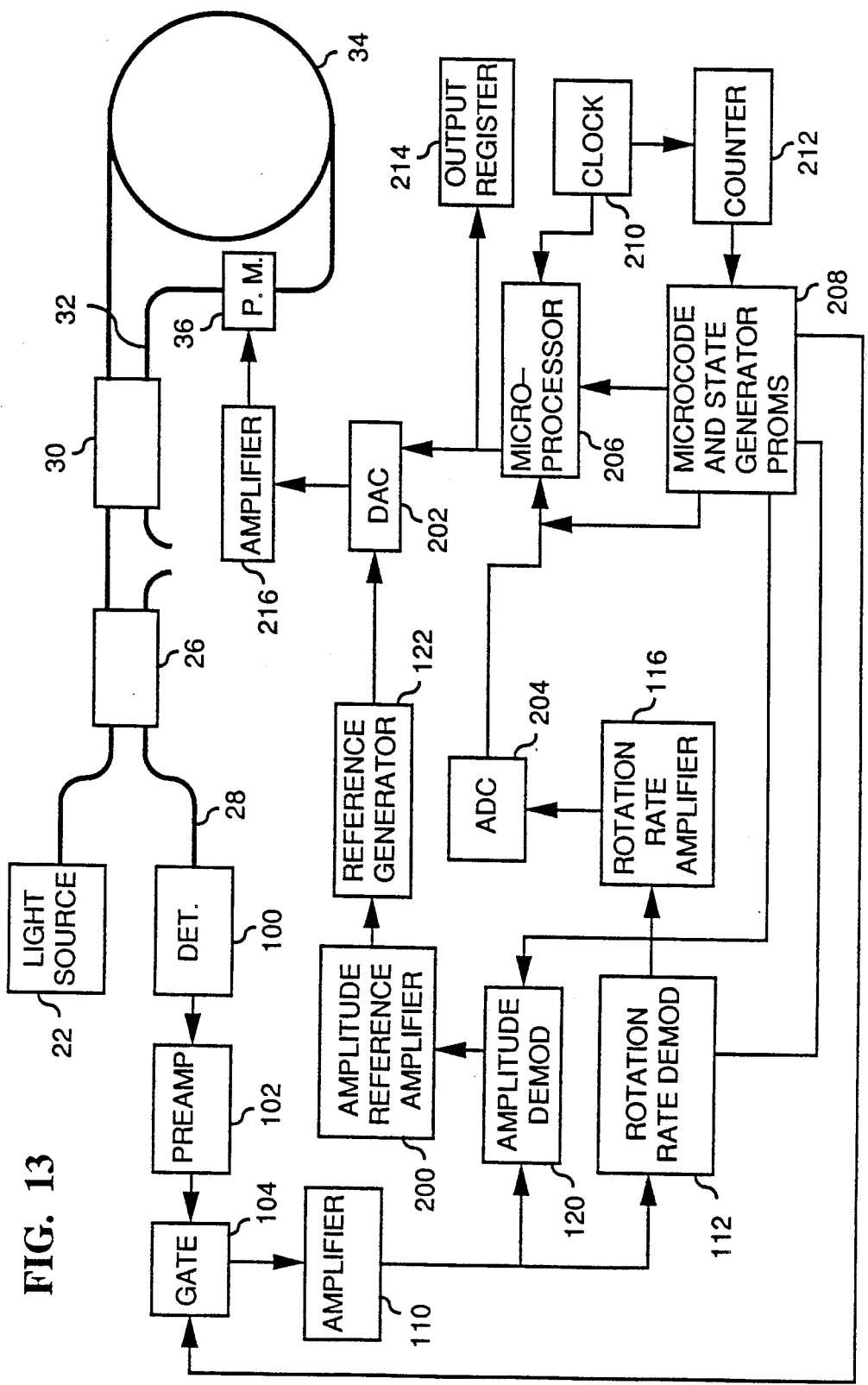
FIG. 13 is a block diagram of a second embodiment of the invention.

FIG. 13 shows a second embodiment of the invention. The basic structure of the fiber optic rotation sensor included in FIG. 13 is identical to that of FIG. 1. Components in FIG. 13 that are the same as the corresponding components in FIG. 1 have the same reference characters in both drawings. These components are the source 22, couplers 26 and 30, fibers 24, 28 and 32, phase modulator 36, sensing coil 34, detector 102, preamplifier 103, gate 104, amplifier 110, amplitude demodulator 120, rotation rate demodulator 11, rotation rate amplifier 116 and reference generator 122. Items shown in FIG. 13 that are not in FIG. 1 have reference characters beginning with the numeral "2".

The signal output from the amplifier 110 is input to the amplitude demodulator 120 and to the rotation rate demodulator 112. Both the amplitude demodulator 120 and the rotation rate demodulator 112 may be commercially available demodulator circuits such as a Siliconix DG271. The rotation rate demodulator 112 recovers rate error signals from the sensing loop. These rotation rate error signals are amplified by the rotation rate amplifier 116, which may be a signal amplifying device such as a Burr Brown 3550 operational amplifier. After amplification, the rate error signals are converted to digital signals by an analog to digital converter 204 that is connected to the output of the rotation rate amplifier 116. The analog to digital converter 204 may be any suitable device, such as a Burr Brown PCM75 sixteen bit analog to digital converter for converting analog electrical signals to digital.

The digital rotation rate error signals from the analog to digital converter 204 are input to a microprocessor 206, which may be a Logic Devices Inc. 429C01 bit slice microprocessor. The microprocessor 206 is used to accumulate the error signal, scale it and sum it with the bias carrier signal from a microcode and state generator PROM device 208. The microprocessor 206 is operated as a state device. It generates the appropriate states of the bias carrier signal and the reference zero periods. The microprocessor 206 is operated conventionally and is clocked and controlled in its states by a set of PROMs 208 that generate the gate and demodulation signals. A clock 210 supplies clock signals to the microprocessor 206. The clock 210 also provides clock signals to a counter 212 that supplies signals to the PROMs 208.

The digital output of the microprocessor 206 drives both the feedback digital to analog converter 202 and the digital rotation rate output interface, which may be a sixteen bit output register 214.

The amplitude demodulator 120 provides an output signal to an amplitude reference amplifier 200, which drives the reference generator 122. The output of the reference generator 122 is input to the digital to analog converter 202. The digital to analog converter 202 provides signals to a video amplifier 216, which drives the phase modulator 36. The amplitude demodulator 120 recovers a signal from the amplifier 110 and uses this signal to control the gain of the digital to analog converter 202 to scale its output to be $2\pi$.

The digital to analog converter 202 may be a Burr Brown 710, which is a sixteen bit device. The gain of the digital to analog converter 202 is controlled by using the reference amplifier 200 and the reference generator 122 to scale the output of the digital to analog converter 202 and the video amplifier so the full scale on the digital to analog converter 202 is $2\pi$ or a multiple of $2\pi$. The output video amplifier 216 may be any suitable amplifier, such as a Comlinear CLC 210 high speed operational amplifier, for amplifying electrical signals in the frequency range commonly used for video signals.

I claim:

1. Apparatus for processing signals output from a fiber optic rotation sensor that guides a pair of counter-propagating light waves in a sensing loop of optical fiber and combines the waves to produce an interference pattern indicative of the phase difference between the waves comprising:
   detector means for producing a detector signal indicative of the phase difference of the waves;
   phase modulator means for modulating the phase of light waves in the sensing loop;
   means responsive to the detector signal for controlling the phase modulator means with a modulating signal for nulling the detector signal, the modulating signal producing stepped modulations in the phase of light waves in the sensing loop;
   gating means connected to an output of the detector means;
   rate demodulating means connected to an output of the gating means for determining the rate of rotation; and
   amplitude demodulating means connected to the output of the gating means for adjusting the calibration of the rate demodulator.

2. Apparatus according to claim 1 wherein the modulating signal is set to a reference zero for a first time interval equal to the transit time of a light wave through the sensing loop.

3. Apparatus according to claim 1 wherein the modulating signal is adjusted to set the output signal of the sensing loop to be equal to a multiple of a known reference value for a second time interval equal to the transit time of a light wave through the sensing loop.

4. Apparatus according to claim 3 wherein the reference value alternates between $\pm\pi/N$ radians of phase shift for measuring the rotation rate, where N is any real number.

5. Apparatus according to claim 3 wherein the reference value alternates between $\pm\pi/N\pm(2\pi-\pi/N)$ radians of phase shift for successive repetitions of the second time interval.

6. Apparatus according to claim 4 wherein the reference value alternates between $\pm\pi/N\pm(2\pi-\pi/N)$ radians of phase shift for successive repetitions of the second time interval.

7. Apparatus according to claim 1 including means for setting the modulating signal alternately set to a reference zero for a first time interval and then adjusting the modulating signal to set the output signal of the sensing loop to be equal to a multiple of a known reference value for a second time interval with the reference value alternating between $\pm\pi/N$ radians of a phase shift for measuring the rotation rate, where N is any real number.

8. Apparatus according to claim 1 including means for setting the modulating signal alternately set to a reference zero for a first time interval and then adjusting the modulating signal to set the output signal of the sensing loop to be equal to a multiple of a known reference value for a second time interval with the reference value alternating between $\pm\pi/N\pm(2\pi-\pi/N)$ for successive repetitions of the second time interval, where N is any real number.

9. Apparatus according to claim 7 wherein the reference value alternates between $\pm\pi/N\pm(2\pi-\pi/N)$ for successive repetitions of the second time interval.

10. Apparatus according to claim 1, further including:
    a summing circuit connected to the rate demodulating means for receiving a rate signal therefrom;
    reference signal generating means connected between the summing amplifier and the amplitude demodulating means for providing a calibrating signal to the summing amplifier; and
    bias carrier generator means connected to each of the gating means, the rate demodulating means and the summing circuit for providing actuating signals thereto, the summing circuit being formed to combine the rate signal, the calibrating signal and the actuating signal to produce a driving signal for the phase modulating means so that the modulating means adjusts the phases of the waves in the sensing loop to null the detector signal during selected time intervals.

11. Apparatus according to claim 10, further including a switching device connected between the summing circuit and the phase modulating means, the switching device being controlled by signals from the bias carrier generator means to selectively apply the driving signal to the phase modulating means.

12. A method for processing signals output from a fiber optic rotation sensor that guides a pair of counter-propagating light waves in a sensing loop of optical fiber and combines the waves to produce an interference pattern indicative of the phase difference between the waves, comprising the steps of:
    producing an electrical signal indicative of the phase difference of the waves;
    modulating the phase of light waves in the sensing loop with a phase modulator;
    controlling the phase modulator means with a modulating signal that produces stepped modulations in the phase of light waves in the sending loop;
    gating an output of the detector means with gating means;
    determining the rate of rotation with rate demodulating means connected to an output of the gating means; and
    adjusting the calibration of the rate demodulating means with amplitude demodulating means connected to the output of the gating means.

13. The method of claim 12 including the step of setting the modulating signal set to a reference zero for a first time interval equal to the transit time of a light wave through the sensing loop.

14. The method of claim 13 including the step of adjusting the modulating signal to set the output signal of the sensing loop to be equal to a multiple of a known reference value for a second time interval equal to the transit time of a light wave through the sensing loop.

15. The method of claim 12 including the step of setting the modulating signal alternately to a reference zero for a first time interval and then adjusting the modulating signal to set the output signal of the sensing loop to be equal to the multiple of a known reference value for a second time interval, the reference value alternating between $\pm\pi/N$ radians of phase shift, where N is any real number.

16. The method of claim 12 including the step of setting the modulating signal alternately to a reference zero for a first time interval and then adjusting the modulating signal to set the output signal of the sensing loop to be equal to a multiple of a known reference value for a second time interval, the reference value alternating between $\pm\pi/N\pm(2\pi-\pi/N)$ radians of phase shift for successive repetitions of the second time interval, where N is a real number.

17. The method of claim 16 including the step of setting the reference value to alternate between $\pm\pi/N$ radians of phase shift.

18. A method for processing signals output from a fiber optic rotation sensor that guides a pair of counter-propagating light waves in a sensing loop of optical fiber and combines the waves to produce an interference pattern indicative of the phase difference between the waves, comprising the steps of:
  producing an electrical signal indicative of the phase difference of the waves;
  modulating the phase of light waves in the sensing loop with a phase modulator;
  controlling the phase modulator means with a modulating signal that producing stepped modulations in the phase of light waves in the sensing loop;
  connecting a summing circuit to the rate demodulating means for receiving a rate signal therefrom;
  connecting a reference generator between the summing amplifier and the amplitude demodulating means for providing a calibrating signal to the summing amplifier; and
  providing actuating signals to each of the gating means, the rate demodulating means and the summing circuit with bias carrier generator means, the summing circuit being formed to combine the rate signal, the calibrating signal and the actuating signal to produce a driving signal for the phase modulating means so that the modulating means adjusts the phases of the waves in the sensing loop to null the detector signal during selected time intervals.

19. Apparatus according to claim 18, further including the steps of:
  connecting a switching device between the summing circuit and the phase modulating means; and
  controlling the switching device with signals from the bias carrier generator means to selectively apply the driving signal to the phase modulating means.

* * * * *